United States Patent [19]

Seidel

[11] Patent Number: 4,767,270
[45] Date of Patent: Aug. 30, 1988

[54] HOOP FAN JET ENGINE

[75] Inventor: Gerhard E. Seidel, Renton, Wash.

[73] Assignee: The Boeing Company, Seattle, Wash.

[21] Appl. No.: 852,652

[22] Filed: Apr. 16, 1986

[51] Int. Cl.$^4$ .............................................. B64C 11/48
[52] U.S. Cl. ..................................... 416/129; 416/130; 416/189
[58] Field of Search ................................ 416/127–130, 416/189 R, 189 B, 171, 157 B; 60/268, 39.162

[56] References Cited

U.S. PATENT DOCUMENTS

| 197,419 | 11/1977 | Smith . | |
|---|---|---|---|
| 1,067,385 | 7/1913 | Taylor | 416/189 R |
| 1,233,610 | 7/1917 | Schleicher . | |
| 1,740,095 | 12/1929 | Jervan . | |
| 1,820,467 | 8/1931 | Liska | 416/189 R X |
| 2,088,802 | 8/1937 | McLaughlin | 416/189 R X |
| 2,281,203 | 4/1942 | Pitcairn | 244/17 |
| 2,366,795 | 1/1945 | Lamoreaux | 416/189 R X |
| 2,404,767 | 7/1946 | Heppner | 60/35.6 |
| 2,407,630 | 9/1946 | Dewan . | |
| 2,425,904 | 8/1947 | Vernon . | |
| 2,478,206 | 8/1949 | Redding | 60/35.6 |
| 2,613,749 | 10/1952 | Price | 416/129 |
| 2,815,188 | 12/1957 | Nelson . | |
| 2,835,332 | 5/1958 | Fry . | |
| 2,870,847 | 1/1959 | Fry . | |
| 2,945,672 | 7/1960 | Wagner et al. . | |
| 3,047,251 | 7/1962 | Lewis | 416/189 R X |
| 3,574,477 | 4/1971 | Dolf et al. | 415/60 |
| 3,729,957 | 5/1973 | Petrie et al. | 74/655 R X |
| 3,768,546 | 10/1973 | Shipes | 165/39 |
| 3,811,791 | 5/1974 | Cotton | 416/129 |
| 3,830,587 | 8/1974 | Shipes et al. | 415/130 |
| 4,370,097 | 1/1983 | Hanson et al. | 416/228 |
| 4,381,901 | 5/1983 | LaBudde | 416/189 R X |
| 4,390,148 | 6/1983 | Cudmore | 244/19 |
| 4,563,129 | 1/1986 | Pagluica | 416/129 |
| 4,621,978 | 11/1986 | Stuart | 416/128 |

FOREIGN PATENT DOCUMENTS

| 181838 | 4/1955 | Austria . | |
|---|---|---|---|
| 669167 | 11/1929 | France | 416/189 R |
| 974601 | 2/1951 | France | 416/129 |
| 185336 | 10/1936 | Switzerland | 416/130 |
| 175922 | 3/1922 | United Kingdom | 416/189 R |
| 588096 | 5/1947 | United Kingdom | 416/129 |
| 991744 | 5/1965 | United Kingdom | 416/189 R |
| 1324356 | 7/1973 | United Kingdom | 416/189 R |
| 2129502 | 5/1984 | United Kingdom | 60/268 |
| 2145777 | 4/1985 | United Kingdom | 416/127 |

OTHER PUBLICATIONS

Aerospace America; Oct. 1984; pp. 52–55.
Aviation Week & Space Technology; 6-16-86; pp. 26–27, 46–47.

Primary Examiner—Everette A. Powell, Jr.
Attorney, Agent, or Firm—Christensen, O'Connor, Johnson & Kindness

[57] ABSTRACT

A fan jet engine assembly comprising a hoop fan surrounding a turbojet (19) is disclosed. The hoop fan includes a pair of rotatable hubs (27, 29) that encircle the turbojet. A stage of fan blades (31, 33) is attached to each hub (27, 29) and radiates outwardly therefrom. The tips of the blades (31, 33) of at least one of the stages attached to a loop (23/25 or 61) that encircles the tips of the blades (31, 33) of both stages. Due to the attachment of the hoop (23/25 or 61) to the blades (31, 33), the hoop rotates as the hubs (27, 29) are rotated by the turbojet (19). The pitch of the blades of at least one of the stages is adjustable.

14 Claims, 6 Drawing Sheets

Fig. 5.

HOOP FAN JET ENGINE

TECHNICAL AREA

This invention is directed to engines and, more particularly, jet engines.

BACKGROUND OF THE INVENTION

Gas turbines are widely used in different types of aircraft propulsion engines. In turboprop engines, turbines are used to rotate a propeller that creates the propulsion force. In turbojet engines, turbines are used to produce a jet exhaust that creates the propulsion force. Both turboprop and turbojet engines have advantages and disadvantages. In the past, attempts have been made to combine the advantages of both types of engines. One common result of such a combination is the fan jet engine. In fan jet engines, a turbojet engine is substantially entirely surrounded with a fan air duct. Additional thrust is provided by accelerating the air that passes through the fan air duct. Among the advantages of fan jet engines is their low noise, which results from this bypass and from the shielding effect provided by the fan air duct. Further, the stationary cowls or shrouds that define the outer wall of the fan air duct provide additional turbine blade burst protection. While having these and other advantages, fan jet engines, particularly high bypass ratio turbofan jet engines, have disadvantages. For example, the stationary cowls or shrouds of such engines are difficult to attach both to the engine and to the aircraft to be propelled by the engine.

In addition to fan jet engines, various other attempts have been made to combine the advantages of turbojet and turboprop engines. Mainly, these proposals have suggested adding propeller-type blades to turbojet engines. Proposals have been made to add propeller blades to the front, the rear and the mid regions of turbojet engines, see for example U.S. Pat. Nos. 2,478,260, 2,404,768 and 3,811,791. For various reasons, these proposals have not been adopted or, if adopted, have not been widely used.

The present invention is directed to providing a hoop fan jet engine that combines the advantages of turbojet and turboprop engines.

SUMMARY OF THE INVENTION

In accordance with this invention, a hoop fan jet engine comprising a hoop fan surrounding a turbojet is provided. The hoop fan includes a rotatable hub that encircles the turbojet. At least two stages of blades rotate in opposite directions and are attached to and radiate outwardly from the hub. The blade tips of at least one of the stages are attached to a lightweight hoop that surrounds the blades and, thus, rotates with the blades as the hub is rotated by the turbojet. Further, the pitch of the blades of at least one of the stages is adjustable.

In accordance with other aspects of this invention, the hoop is split into two sections each of which surround and is attached to the blade tips of one of the stages. The pitch of the blades of one or both of the stages is adjustable.

In accordance with alternative aspects of this invention, the hoop is unitary and attached to the tips of the blades of only one of the stages. While being attached to the tips of the blades of only one of the stages, the hoop overlies the tips of the blades of the unattached stage. Again, the pitch of the blades of one or both of the stages is adjustable.

As will be readily appreciated from the foregoing description, the invention provides a hoop fan jet engine that includes a lightweight hoop that rotates as two stages of blades that extend between the hoop and a turbojet are rotated by the turbojet. Either the blades of both stages are pitch adjustable or only the blades of one stage are pitch adjustable. Further, the hoop can be a unitary member or a segmented member. If segmented, the hoop segments rotate in opposite directions.

As will be appreciated by those skilled in the aircraft propulsion system art, the hoop provides a number of advantages. Engine efficiency for a given engine diameter is improved. Engine efficiency is improved because, like a wing having winglets, the load distribution along the span of a propeller of fan blades supported by end plates (the hoop) is better. The same engine thrust can, therefore, be produced with a smaller diameter blade at an ultrahigh-bypass ratio. The end result is lower fuel consumption or, stated another way, improved engine efficiency. Because the diameter is decreased for the same engine efficiency, a hoop fan jet engine formed in accordance with the invention has better ground clearance when mounted beneath the wing of an aircraft, when compared with other engines, such as engines with open propellers. Further, structural integrity over fan jet engines is improved because the turbojet core can be directly attached to the aircraft. In addition, the creation and transmission of vortices and vibration is substantially reduced, if not entirely prevented, because the end plates prevent the creation of the vortices that normally are produced by open ended propeller tips. Thus, the noise treatment requirements and fatigue problems of the adjacent airframe are minimized.

BRIEF DESCRIPTION OF THE DRAWINGS

The foregoing and other advantages of the present invention will become better understood by reference to the following detailed description when taken in conjunction with the accompanying drawings wherein.

DESCRIPTION OF THE PREFERRED EMBODIMENTS

Figure 1:
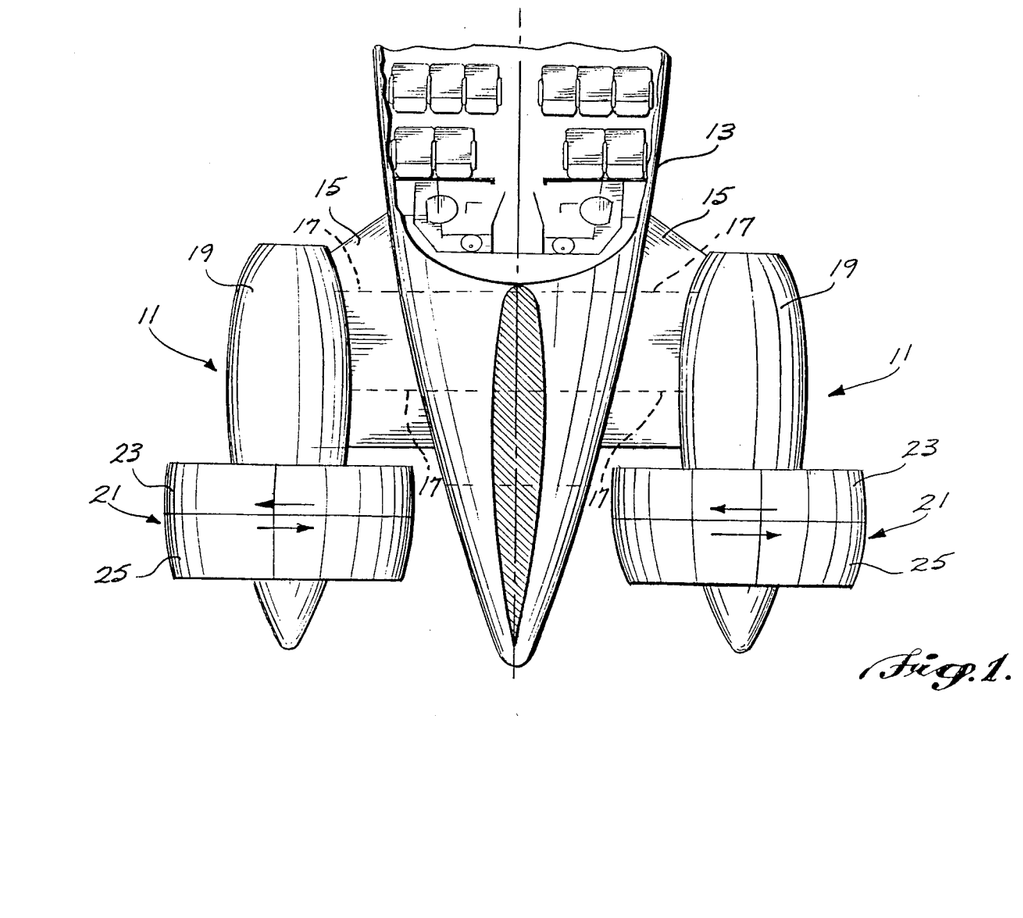
FIG. 1 is a plan view illustrating hoop fan jet engines formed in accordance with the invention attached to the rear portion of the fuselage of an aircraft.

FIG. 1 illustrates a pair of hoop fan jet engines 11 formed in accordance with the invention mounted on opposite sides of the aft portion of the fuselage 13 of an aircraft. The hoop fan jet engines 11 are supported at positions spaced from the sides of the fuselage 13 by struts or pylons 15. The struts or pylons 15 are conventional and do not form part of the invention. In general, they are aerodynamically-shaped and include suitable structural elements. The structural elements may include transverse beams 17 illustrated by dotted lines in FIG. 1. The transverse beams 17 may pass through the aft portion of the fuselage 13 and extend from one engine 11 to the other engine 11.

Each of the hoop fan jet engines 11 includes a conventional turbojet 19. Surrounding each of the tubojets 19 is a hoop fan assembly 21 formed in accordance with the invention. The hoop fan assembly 21 surrounds a narrow region of the turbojets 19 near the aft portions thereof, beyond the aft end of the struts or pylons 15.

Figure 2:
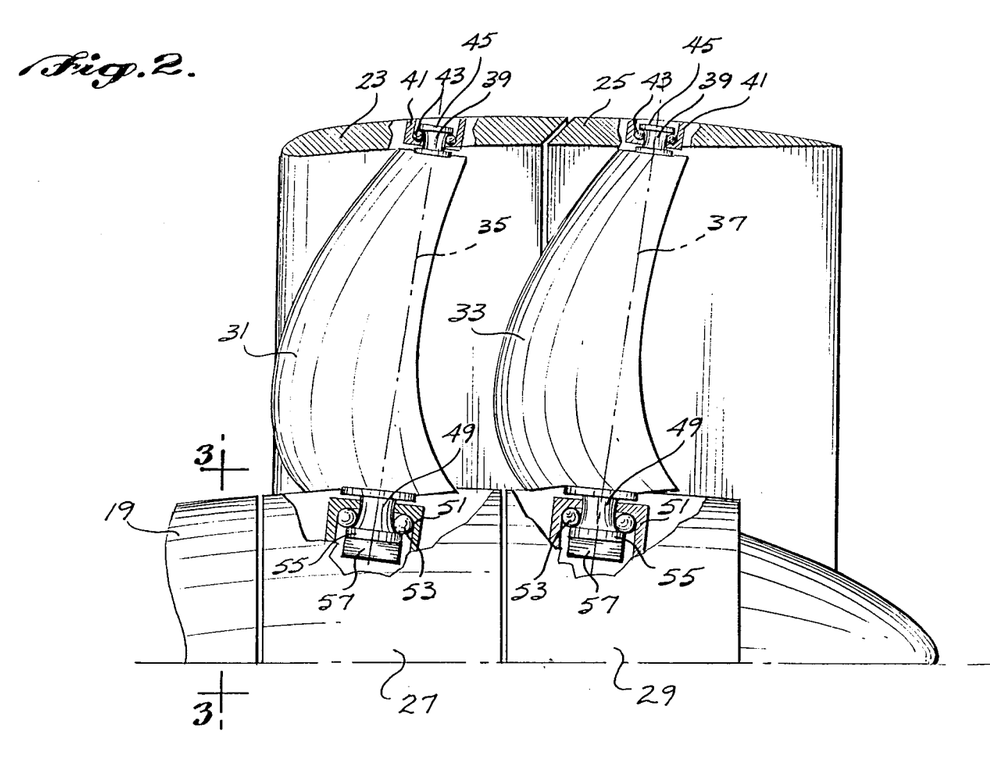
FIG. 2 is a longitudinal cross-sectional view illustrating the hoop and blade mechanism of a hoop fan jet engine formed in accordance with the invention.
Figure 3:
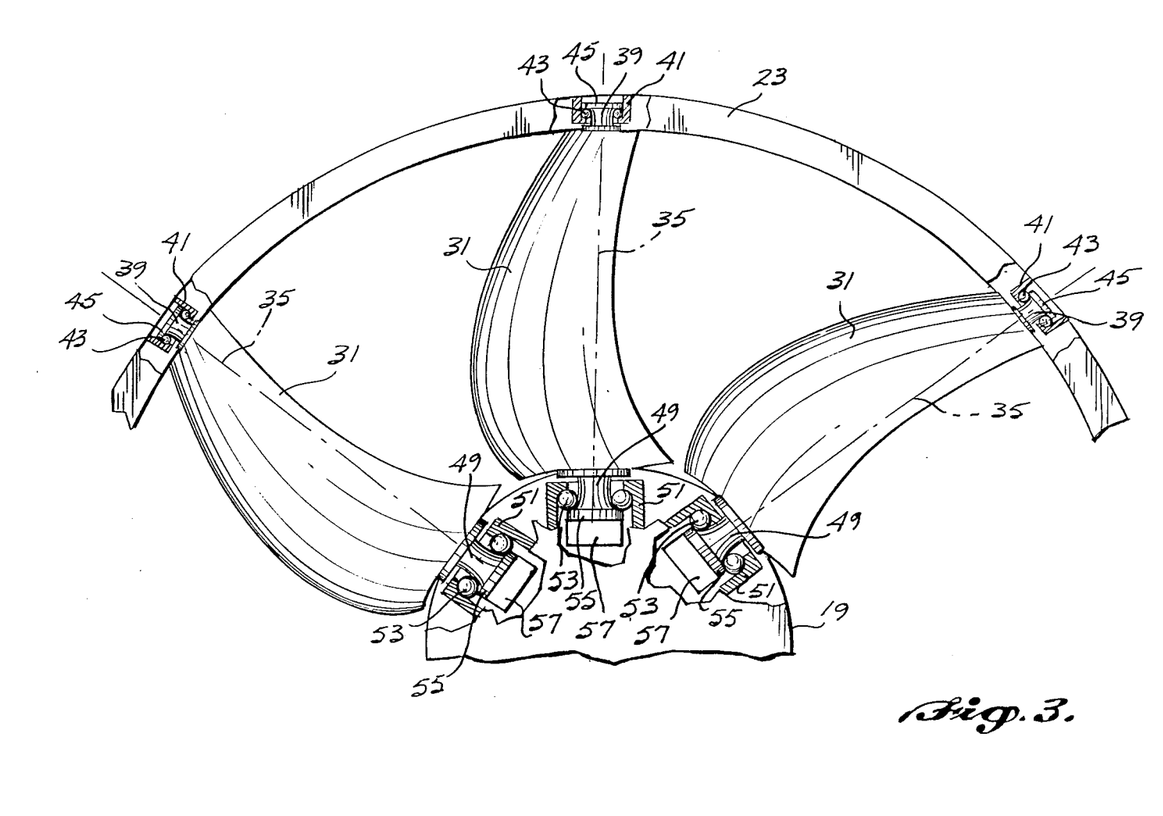
FIG. 3 is a front view of the structure illustrated in FIG. 2.

The hoop fan assembly 21 may take on various forms. The form illustrated in FIG. 1, and shown in more detail in FIGS. 2 and 3, includes a hoop formed of two sections—a front section 23 and a rear section 25. The front and rear hoop sections 23 and 25 are short rings of substantially the same diameter and are juxtaposed such that the front section 23 lies in front of the rear section 25. As best shown in FIG. 2, cross-sectionally, the juxtaposed front and rear hoop sections 23 and 25 are aerodynamically shaped. More specifically, the nose of the front hoop section 23 has a blunt shape similar to that of the leading edge of a wing. The trailing region of the rear hoop section 25 tapers into a feather edge. In accordance with the invention, the front and rear hoop sections 23 and 25 are formed of lightweight, high-strength materials. For example, the hoop sections could be created using graphite composite technology.

Formed in the aft portion of the nacelle of the turbojet 19 are a pair of rotatable hubs 27 and 29. The hubs are of substantially equal diameter and juxtaposed such that one hub lies in front of the other hub. In general, the front and rear rotatable hubs 27 and 29 are surrounded by the front and rear hoop sections 23 and 25, respectively. Radially extending between the related rotatable hubs 27 and 29 and the hoop sections 23 and 25 are two stages of fan blades 31 and 33. More specifically, the first stage fan blades 31 radially extend between the front hub 27 and the front hoop section 23. The second stage fan blades 33 radially extend between the rear hub 29 and the rear hoop section 25. As shown in FIG. 2, the leading edge of the fan blades 31 and 33, starting at the hubs 27 and 29, first sweep forwardly and then rearwardly with respect to the intake end of the turbojet 19.

For purposes of ease of understanding, the mechanisms for attaching the ends of the blades 31 and 33 to the hubs 27 and 29 and to the hoop sections 23 and 25 are shown in enlarged form. In this regard, attached to the outer end of each of the fan blades 31 and 33 is a stub shaft 39. The outer stub shafts extend into box-like housings 41 formed in the front and rear hoop sections 23 and 25. The outer stub shafts 39 are rotatably held in place by any suitable mechanism, shown schematically as bearing balls 43 that are retained by flanges 45 located at the tips of the outer stub shafts 39.

It is to be understood that the stub shaft/box-like assembly schematically illustrated in the drawings and described above is only one of many ways that the outer tips of the blades 31 and 33 can be attached to the hoop sections 23 and 25. Any coupling mechanism that allows the pitch of the blades to be varied, which is structurally sound and allows the advantages of the invention to be achieved, can be utilized. In cases of the hereinafter described embodiments of the invention wherein the pitch of some of the blades is fixed, a rigid coupling mechanism can be utilized.

The inner ends of the fan blades 31 and 33 are rotatably attached to their respective hubs 27 and 29. Again, the rotatable attachment mechanism is shown in enlarged form. In this regard, attached to the inner end of each of the fan blades 31 and 33 is an inner stub shaft 49. The inner stub shafts 49 protrude into box-like housings 51 formed in the front and rear hubs 27 and 29. The inner stub shafts are rotatably held in place by any suitable mechanism shown schematically in FIGS. 2 and 3 as bearing balls 53 retained by a flange 55 formed in the outer edge of the inner stub shafts 49. As shown by the dash-dot lines 35 and 37 in FIGS. 2 and 3 the rotational axes of the outer and inner stub shafts 39 and 49 of each fan blade 31 and 33 coincide, i.e., the rotational axes are coaxial. The dash-dot lines 35 and 37 also show that the axis of rotation of the fan blades 31 and 33 lies along a line that extends radially outwardly with respect to the hubs 27 and 29 and rearwardly with respect to the intake end of the turbojet 19.

Coupled to each of the inner stub shafts 49 is a pitch control mechanism 57. Since mechanisms for controlling propeller and fan blade pitch are well known in the prior art and because a specific pitch control mechanism does not form part of the present invention, the details of a pitch mechanism are not shown in the drawings and described herein.

As will readily be appreciated from the foregoing description, when the rotatable hubs 27 and 29 are rotated by the turbojet 19, the blades 31 and 33, and their attached hoop sections 23 and 25, are rotated. As illustrated in FIG. 1, preferably, one set of blades and its associated hoop section rotates in one direction, i.e., clockwise, and the other set of blades and its associated hoop section rotate in the opposite direction, i.e., counterclockwise. For reasons of manufacturing and parts commonality, preferably, the rotational direction of the left-hand and right-hand engines are identical, as shown in FIG. 1. Alternatively, the rotational directions could be balanced. That is, the front hub of the engine on one side of the aircraft could rotate in a clockwise direction and the rear hub rotate in a counterclockwise direction, and the front hub of the engine located on the other side of the aircraft rotate in a counterclockwise direction and the rear hub rotate in a clockwise direction, or vice versa.

As required by operating conditions, the pitch of the blades 31 and 33 as well as the speed of blade rotation is controlled. While the preferred form of the invention includes mechanisms for controlling the pitch of both sets of blades, if desired, the pitch of either or both blade stages could be fixed.

Figure 4:
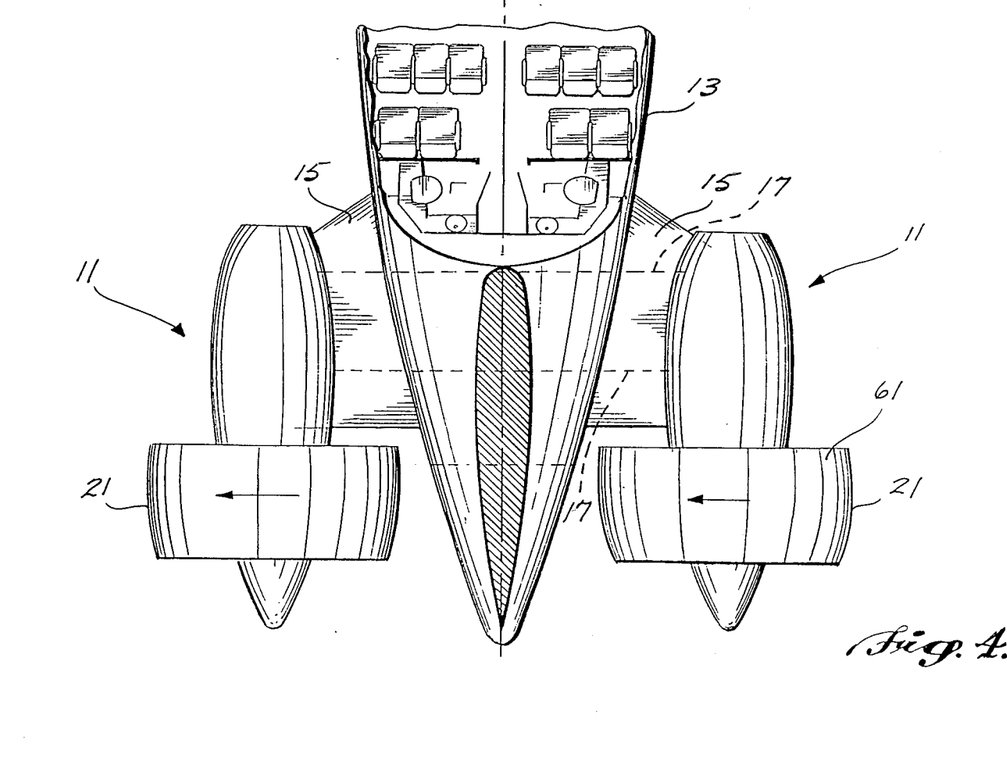
FIG. 4 is a plan view, similar to FIG. 1, of an alternative embodiment of the invention.
Figure 5:
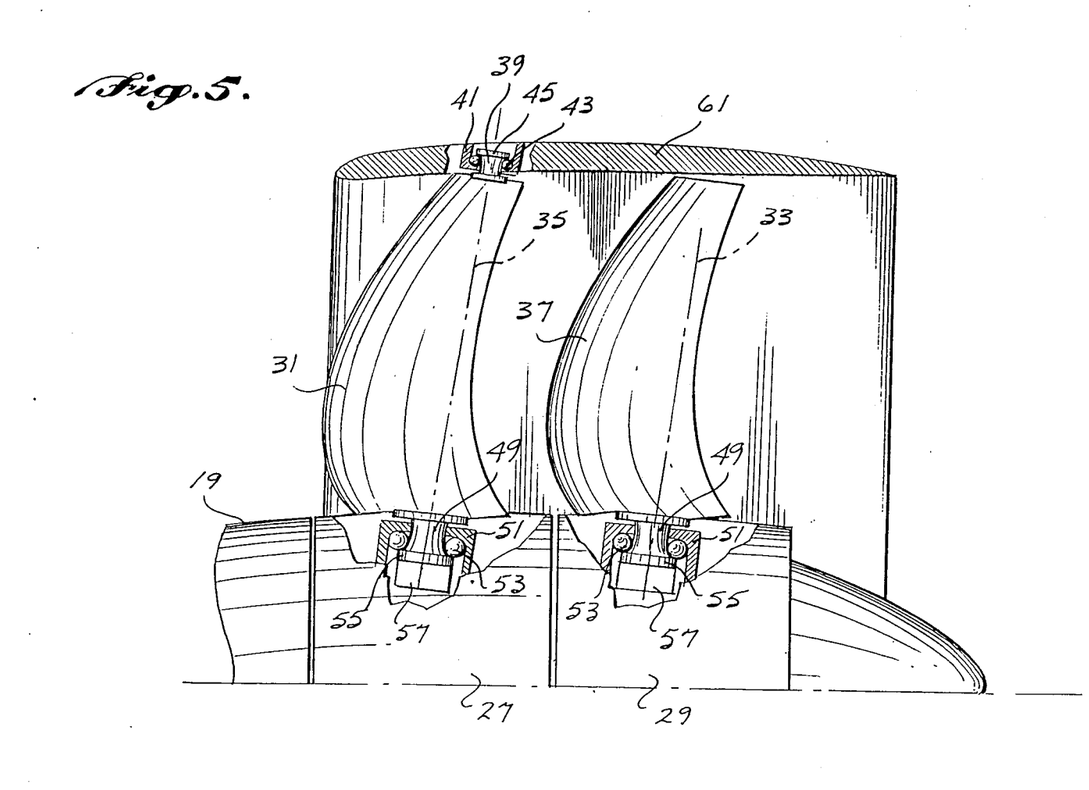
FIG. 5 is a longitudinal cross-sectional view of one hoop and blade arrangement suitable for use in the alternative embodiment of the invention illustrated in FIG. 4.
Figure 6:
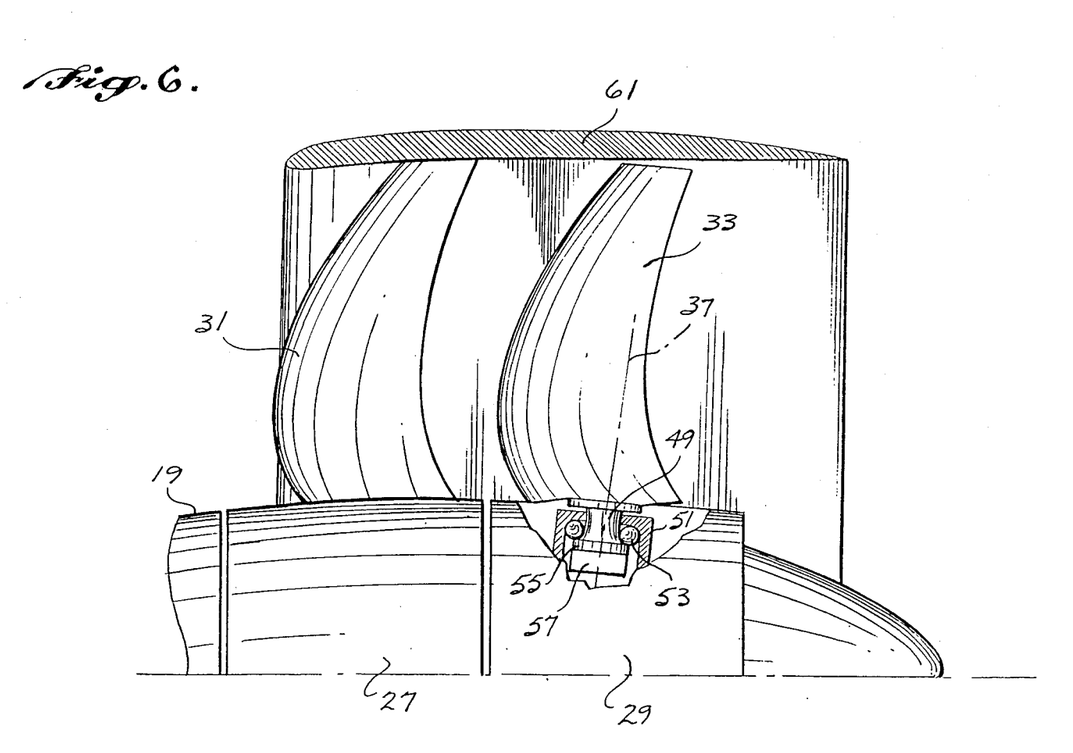
FIG. 6 is a longitudinal cross-sectional view of an alternative hoop and blade arrangement suitable for use in the alternative embodiment of the invention illustrated in FIG. 4.

FIGS. 4–6 illustrate alternative embodiments of the invention in which the hoops are unitary rather than formed of two sections. Since many of the components of the alternative embodiments of the invention shown in FIGS. 4–6 are the same as those shown in the FIGS. 1–3 embodiment, where applicable, common reference numbers are used.

FIG. 4 is an illustration similar to FIG. 1. The only difference between FIG. 4 and FIG. 1 is that the hoop 61 of the hoop assembly 21 is, as noted above, unitary. As shown in FIG. 5, the unitary hoop 61 circumscribes front and rear rotatable hubs 27 and 29 formed in the same manner as the front and rear hubs 27 and 29. Radiating outwardly from the rotatable hubs 27 and 29 are first and second stages of fan blades 31 and 33. The blades 31 of the first stage are rotatably coupled to the front hub 27 and the unitary hoop 61 in the same way that the blades 31 were rotatably connected to the leading hub 27 and the front hoop section 23 of the embodiment of the invention illustrated in FIGS. 1-3. Since the illustrated coupling mechanism is identical, it is not redescribed here. The blades 33 of the second stage are coupled only to the rear hub 29. The blades 33 of the second stage are not attached to the unitary hoop 61. Even though not attached to the unitary hoop 61, the pitch of the second stage blades 33 is adjustable. As a result, the embodiment of the invention illustrated in FIG. 5 is similar to the embodiment of the invention illustrated in FIGS. 1-3 with the exception that the hoop is unitary and the outer tips of the second stage blades are unattached.

FIG. 6 illustrates an embodiment of the invention similar to the embodiment of the invention illustrated in FIG. 5 except that the pitch of the blades 31 of the first stage is fixed. That is, the first stage blades 31 are joined to both the front hub 27 and to the unitary hoop 61 in a nonrotatable manner.

As will be readily appreciated from the foregoing description, a hoop fan jet engine formed in accordance with the invention includes a hoop fan positioned to encircle a turbojet engine. The hoop fan includes rotatable hubs, outwardly extending fan blades and an encircling hoop. The fan blades are attached to the hubs and the tips of at least some of the fan blades are attached to the hoop. Thus, as hubs rotate, the blades and the hoop rotate. The blades can have a fixed pitch or they can be pitch-adjustable. Further, the hoop can be unitary or sectioned. As shown in FIG. 4, for reasons of manufacturing and parts commonality, the rotational direction of the left-hand and right-hand engines should be identical. Alternatively, inertial forces could be balanced by having the hoops located on opposite sides of an aircraft rotate in opposite directions. If sectioned, the sections could rotate in opposite directions and the related sections located on opposite sides of the aircraft could rotate in opposite directions.

While the hoops can be formed of various materials, preferably, the hoops are formed of lightweight, high-strength materials. For example, the hoops can be formed of a graphite composite, a kevlar composite or various thermoplastic compositions. As illustrated, the blades are twisted. Preferably, each blade includes a spar. In the case of pitch adjustable blades, the spars run between the stub shafts.

A hoop fan jet engine formed in accordance with the invention has a number of advantages. Because ultra-high bypass ratio benefits can be achieved, fuel consumption is decreased. The hoop provides increased engine efficiency for a given overall diameter because load distribution along the span of blades having end plates (the hoop) is more efficient than is the load distribution along open-ended blades. As a result, the same engine thrust can be produced with a smaller overall diameter engine. Smaller diameter engines are more useful in low-wing aircraft because ground clearance is greater than it would be for larger diameter engines. The hoop also improves structural integrity and prevents the creation or transmission of vortices and vibration. Because vortices and vibration transmission is reduced, the amount of noise treatment required by the adjacent fuselage is minimized. More specifically, like end plates, the hoop prevents the creation of vortices on the tips of the blades. Since vortice generation is reduced, if not eliminated, noise is reduced. Because noise is reduced, the need for noise treatment is reduced. Noise reduction also occurs because the hoop shields the adjacent portion of the aircraft from engine noise. Also, the inside of the hoop can contain sound absorbing material. Because vibration is reduced or eliminated, fatigue problems of the adjacent airframe caused by engine vibration are minimized.

While preferred embodiments of the invention have been illustrated and described, it will be appreciated that various changes can be made therein without departing from the spirit and scope of the invention. For instance, a hoop fan assembly including a single stage of blades surrounded by a hoop could be used to form an embodiment of the invention. Further, rather than being located near the aft end of a turbojet, as shown in the drawings and described above, the loop fan assembly could be located near the forward end of the turbojet. Consequently, within the scope of the appended claims, the invention can be practiced otherwise than as specifically described herein.

The embodiments of the invention in which an exclusive property or privilege is claimed are defined as follows:

1. A hoop fan jet engine comprising:
    (A) a turbojet engine; and,
    (B) a hoop fan assembly surrounding said turbojet engine for receiving only air that bypasses said turbojet engine, said hoop fan assembly comprising:
        (1) a hub mechanism mounted on said turbojet engine, said hub mechanism including first and second hubs located adjacent to one another and mounted on said turbojet engine so as to encircle a narrow region of said turbojet engine;
        (2) a plurality of fan blades including first and second fan blade stages, said first stage fan blades being mounted on said first hub and radiating radially outwardly from said first hub and said turbojet engine and said second fan blades being mounted on said second hub and radiating radially outwardly from said second hub and said turbojet, each of said fan blades including a leading edge that, starting at the associated first and second hubs, first sweeps forwardly and then rearwardly with respect to the intake end of said turbojet engine;
        (3) a hoop attached to selected ones of the tips of said fan blades and sized so as to encircle all of the fan blades of said first and second fan blade stages, said first and second hubs and said turbojet engine, said hoop forming a single aerodynamically shaped unit having a blunt nose and a feathered trailing end; and,
        (4) pitch control means coupled to selected ones of said fan blades for controlling the pitch of said selected ones of said fan blades along axes that extend radially with respect to the hub associated with said selected ones of said fan blades and rearwardly with respect to the intake end of said turbojet engine.

2. A hoop fan jet engine as claimed in claim 1 wherein the fan blades of one of said first and second fan blade stages are pitch adjustable and the fan blades of the other of said fan blade stages are fixed.

3. A hoop fan jet engine as claimed in claim 1 wherein said hoop is attached to the tips of the fan blades of only one of said first and second fan blade stages.

4. A hoop fan jet engine as claimed in claim 3 wherein the fan blades of one of said first and second fan blade stages are pitch adjustable and the fan blades of the other of said fan blade stages are fixed.

5. A hoop fan jet engine as claimed in claim 1 wherein said hoop is formed of first and second sections, said first section of said hoop being attached to the tips of said fan blades forming said first fan blade stage and said second section of said hoop being attached to the tips of the fan blades forming said second fan blade stage, said first and second sections forming said single aerodynamically shaped unit.

6. A hoop fan jet engine as claimed in claim 5 wherein the fan blades of one of said first and second fan blade stages are pitch adjustable and the fan blades of the other of said fan blade stages are fixed.

7. A hoop fan jet engine as claimed in claim 5 wherein the fan blades of both of said first and second fan blade stages are pitch adjustable.

8. A hoop fan jet engine as claimed in claim 1, including sound adsorbing means located on the surface of said hoop facing said fan blades of said first and second fan blade stages.

9. A hoop fan jet engine as claimed in claim 2, including sound adsorbing means located on the surface of said hoop facing said fan blades of said first and second fan blade stages.

10. A hoop fan jet engine as claimed in claim 3, including sound adsorbing means located on the surface of said hoop facing said fan blades of said first and second fan blade stages.

11. A hoop fan jet engine as claimed in claim 4, including sound adsorbing means located on the surface of said hoop facing said fan blades of said first and second fan blade stages.

12. A hoop fan jet engine as claimed in claim 5, including sound adsorbing means located on the surface of said hoop facing said fan blades of said first and second fan blade stages.

13. A hoop fan jet engine as claimed in claim 6, including sound absorbing means located on the surface of said hoop facing said fan blades of said first and second fan blade stages.

14. A hoop fan jet engine as claimed in claim 7, including sound adsorbing means located on the surface of said hoop facing said fan blades of said first and second fan blade stages.

* * * * *